(12) United States Patent
Granger (10) Patent No.: US 10,082,131 B2
(45) Date of Patent: Sep. 25, 2018

(54) ENERGY-SAVING EQUILIBRIUM MECHANISM, ROTATING MACHINE AND METHOD OF IMPLEMENTATION

(71) Applicant: Maurice Granger, Albufeira (PT)

(72) Inventor: Maurice Granger, Albufeira (PT)

( * ) Notice: Subject to any disclaimer, the term of this patent is extended or adjusted under 35 U.S.C. 154(b) by 0 days.

(21) Appl. No.: 15/322,295

(22) PCT Filed: Jan. 27, 2016

(86) PCT No.: PCT/FR2016/050166
§ 371 (c)(1),
(2) Date: Dec. 27, 2016

(87) PCT Pub. No.: WO2017/064378
PCT Pub. Date: Apr. 20, 2017

(65) Prior Publication Data
US 2017/0306931 A1    Oct. 26, 2017

(30) Foreign Application Priority Data
Dec. 30, 2015   (WO) .................. PCT/FR2015/053769

(51) Int. Cl.
*F03G 3/00*     (2006.01)
*F03G 3/06*     (2006.01)
*F03G 7/08*     (2006.01)

(52) U.S. Cl.
CPC .................................. *F03G 3/06* (2013.01); *F03G 7/08* (2013.01)

(58) Field of Classification Search
CPC ...... F16C 3/06; F16C 7/08; F16C 7/10; F16C 3/00
See application file for complete search history.

(56) References Cited

U.S. PATENT DOCUMENTS 5,150,626 A  *  9/1992  Navarro .................... F03G 3/00
                                                              74/61
5,890,400 A      4/1999  Oades
(Continued)

FOREIGN PATENT DOCUMENTS

CA    2851867       11/2015
EP    1031760 A1    2/2000
(Continued)

OTHER PUBLICATIONS

International Search Report and Written Opinion, dated Oct. 13, 2016, in connection with International Application No. PCT/FR2015/053769, 10 pages.
(Continued)

*Primary Examiner* — Phillip A Johnson
(74) *Attorney, Agent, or Firm* — Meunier Carlin & Curfman LLC (57) ABSTRACT

The present invention concerns a mechanism (1), comprising one support (2) including a base (3) and two mobile cog wheels (12; 22) in rotation around their respective axis (A1; A2). The axis (A1; A2) are parallel within a horizontal or vertical reference plane (P0). The cog wheels (12; 22) engage one with the other using a unitary transmission ratio and are mobile in rotation (R1; R2) in opposing directions. The mechanism (1) is characterized in that it comprises two eccentric elements (14; 24) integral with the cog wheels (12; 22) in rotation (R1; R2) and generating moments (M1; M2) of gravity force (P1; P2) around their respective axis (A1; A2); in that the moments (M1; M2) have a same value and a same direction, both being variable depending on their angular position around the axis (A1; A2); and in that for each angular position of the cog wheels (12; 22) and of the eccentric elements (14; 24) around the axis (A1; A2), the mechanism (1) presents an equilibrium configuration at rest. The invention also relates to a rotary machine comprising at
(Continued)

least one such mechanism (1). The invention also relates to an implementation method of such a mechanism (1).

22 Claims, 11 Drawing Sheets (56) References Cited

U.S. PATENT DOCUMENTS 8,307,652 B1 * 11/2012 Gallistel .................. F03G 3/00
475/255
2006/0220385 A1 10/2006 Stanciu

FOREIGN PATENT DOCUMENTS

| EP | 1369564 | 12/2003 |
|----|---------|---------|
| EP | 2781790 | 9/2014 |
| FR | 2811031 | 1/2002 |
| RU | 2354873 | 5/2009 |
| WO | 2008/037014 | 4/2008 |
| WO | 2015/163700 | 10/2015 |

OTHER PUBLICATIONS

International Search Report and Written Opinion, dated Nov. 10, 2016, in connection with International Application No. PCT/FR2016/050166, 10 pages.

International Search Report and written Opinion, dated Oct. 11, 2016, in connection with International Application No. PCT/FR2016/051132, 9 pages.

Non-final Office Action issued in co-pending U.S. Appl. No. 15/322,306, dated Jan. 12, 2018 (23 pages).

* cited by examiner

ENERGY-SAVING EQUILIBRIUM MECHANISM, ROTATING MACHINE AND METHOD OF IMPLEMENTATION

The present invention concerns an energy-saving equilibrium mechanism, in any feasible application, and notably rotating machines. The invention particularly concerns a mechanism with a pendulum and a elliptical motion.

The invention also concerns a rotating machine, for example a motor, a generator or a mixer, comprising at least one such mechanism. The invention particularly concerns a motor comprising several mechanisms placed in series an/or in parallel.

The invention finally concerns an implementation method of such a mechanism.

In the mechanical field, many movement transmission mechanisms exist, such as epicyclic gear trains or crankshafts, adapted to equip rotating machines. Nevertheless, the yields obtained with commonly-known mechanisms are not entirely satisfactory.

The aim of the present invention is to propose a mechanism enabling to economise energy and to improve the yield of a rotating machine.

For said purpose, the object of the invention is a mechanism, comprising one support; a first cog wheel mobile in rotation in relation to the support around a first axis; a second cog wheel mobile in rotation in relation to the support around a second axis; wherein: the axis are parallel within a horizontal or vertical reference plane; and the cog wheels engage one with the other using a unitary transmission ratio and are mobile in rotation in opposing directions.

The mechanism is characterised in that it comprises a first eccentric element integral in rotation with the first cog wheel and generating a first moment of gravity force around the first axis; and a second eccentric element integral in rotation with the second cog wheel and generating a second moment of gravity force around the second axis; in that the moments of the gravity force of the eccentric elements have a same value and a same direction, both being variable depending on their angular position around the axis; and in that for each angular position of the cog wheels and of the eccentric elements around the axis, the mechanism presents an equilibrium configuration at rest.

Thus, the invention makes it possible to reduce the energy necessary to drive the cog wheels in rotation, by virtue of the balancing of the eccentric elements and the centrifugal forces which they generate. The invention even makes it possible to produce energy within a rotating machine, by associating several synchronized mechanisms. The mechanism thus allows to save energy, as described in the description below.

According to other advantageous characteristics of the mechanism according to the invention, taken individually or combined:
- The eccentric elements have a same mass and same dimensions.
- The cog wheels comprise a first wheel having a cog longer than the other cogs and a second wheel having a groove formed between two cogs, and the longer cog and the groove coincide when the cog wheels engage, thereby enabling alignment of the eccentric elements.
- The axis of the cog wheels are horizontal.
- The reference plane is horizontal.
- The reference plane is vertical.
- Preferably, the support includes a base and one pendulum suspended on the base and which supports the axis of the cog wheels. The axis are mobile with the pendulum. The eccentric elements follow an elliptical movement.

According to a first embodiment, the pendulum is suspended on the base by articulated rods. This embodiment is advantageous when the reference plan including the cog wheel axis is horizontal.

Preferably, the mechanism comprises a transmission shaft having an axis aligned with the upper articulations of the connecting link rods. A first distance is defined between the distal end of each eccentric element and the corresponding rotation axis. A second distance is defined equal to the centre-to-centre distance of the connecting suspension rods. The first distance is less than the second distance, in order for the eccentric elements to pass under the transmission shaft.

According to a second embodiment, the pendulum is directly suspended on the base. This embodiment is advantageous when the reference plan including the cog wheel axis is vertical.

Preferably, the mechanism comprises a transmission shaft having an axis aligned with the upper articulation of the pendulum. A first distance is defined between the distal end of each eccentric element and the corresponding rotation axis. A second distance is defined equal to the centre-to-centre distance of the connecting suspension rods. The first distance is less than the second distance, in order for the eccentric elements to pass under the transmission shaft.

The invention also concerns a rotating machine, comprising at least one mechanism such as mentioned above.

The rotating machine is preferably an energy-production or transformation machine, presenting improved yield. Advantageously, said machine is void of a crankshaft.

As non-exhaustive examples, the rotating machine can be a motor, a generator, a mixer, a centrifuge, a compressor, a pump or a turbine.

When the machine is an internal combustion motor, the eccentric elements equipping the mechanism join up in two maximal centrifugation positions, each one corresponding to a combustion of gas inside the motor.

According to a preferred embodiment, the machine comprises at least one pendulum mechanism, wherein the eccentric elements follow an elliptical movement.

According to an advantageous embodiment, the machine comprises at least one pair of pendulum mechanisms placed in series and synchronised. The mechanisms are aligned and mobile in opposing phases.

Each mechanism comprises its own transmission shaft. When the pendulum is suspended on the base by articulated connecting rods, the transmission shaft has an axis aligned with the upper articulations of the articulated rods. When the pendulum is suspended directly on the base, the transmission shaft has an axis aligned with the upper articulation of the pendulum.

Advantageously, the machine comprises a connecting link rod coupled to the mechanisms placed in series. The connecting rod is stationary in a horizontal direction and movable in a vertical direction during the motion of the mechanisms.

According to another advantageous embodiment, the machine comprises several pendulum mechanisms placed in parallel and synchronized. Preferably, the number of mechanisms arranged in parallel is even, which facilitates their synchronization.

The machine comprises a single transmission shaft coupled to the various mechanisms arranged in parallel in a row.

According to another advantageous embodiment, the machine comprises several pairs of pendulum mechanisms. The pairs are placed in parallel and synchronised among themselves. Within each pair, the mechanisms are placed in series and synchronized.

The machine comprises two transmission shafts, each one coupled with different mechanisms placed in parallel in a row.

According to another advantageous embodiment, the machine is a two-stroke motor comprising two pendulum mechanisms. The first two eccentric elements are placed at half-turn intervals, and the second two eccentric elements are placed at half-turn intervals.

According to another advantageous embodiment, the machine is a four-stroke motor comprising four pendulum mechanisms. The first four eccentric elements are placed at quarter-turn intervals, and likewise the second four eccentric elements are placed at quarter-turn intervals.

Preferably, when the machine comprises several pendulum mechanisms, the base is common to all the pendulums. In other words, all the pendulums are suspended on the same base.

Also preferably, the mechanism comprises start-up means of the mechanism or mechanisms, including for example a chain or a gearing system, designed to drive one of the cog wheels into rotation.

Further, the start-up means may comprise a motor for an assisted starting or a crank for a mechanical starting of the mechanism.

According to a particular embodiment, the machine is void of dedicated start-up means of the mechanism or pendulum mechanisms. In this case, the start-up of the mechanism or mechanisms is doable by a simple push on the pendulum or pendulums or on one of the eccentric elements.

Advantageously, the machine comprises energy-collection means when the mechanism is in operation, for example in the form of a generator. In this case, the machine preferably comprises means for starting up the mechanism, including a motor. This enables to overcome the resistance at start-up linked to the presence of the generator.

The object of the invention also concerns an implementation method of a mechanism such as described above, comprising the following successive steps:

- a positioning step of the eccentric elements one in relation to the other and in relation to the cog wheels, in order that the moments of gravity force of the eccentric elements have a same value and a same direction, both being variable according to their angular position around the axis, and that for each angular position of the cog wheels and of the eccentric elements around the axis, the mechanism presents an equilibrium configuration at rest;
- a rotation start-up step of the cog wheels and of the eccentric elements around the axis, wherein the mechanism quits the equilibrium configuration and sets into motion; and
- an operating step, wherein the rotation of the eccentric elements around the axis generates centrifugal force within the mechanism.

The invention will be better understood upon reading the following description, given solely as a non-exhaustive example making reference to the sketches attached hereto, wherein:

FIGS. 1 to 10 show an energy-saving equilibrium mechanism 1, according to a first embodiment of the invention.

Figure 1:
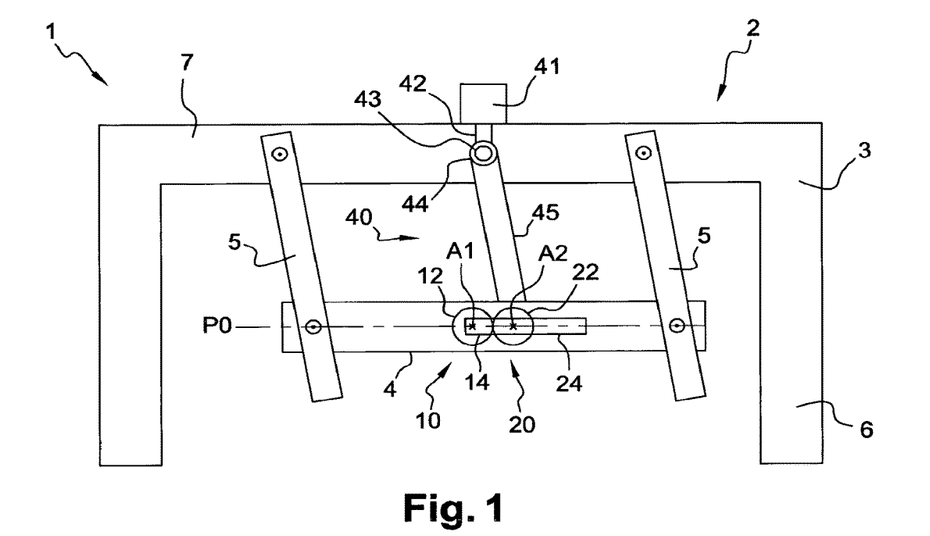
FIG. 1 is a side view of a mechanism according to a first embodiment of the invention, comprising a support with pendulum, two cog wheels and two eccentric elements.

The mechanism 1 comprises a support 2, a first unit 10 mobile in rotation R1 around a first axis A1, a second unit 20 mobile in rotation R2 around a second axis A2, and a start-up means 40 of the mechanism 1. The axis A1 and A2 are horizontally parallel to each other and placed within a reference plane P0 which is horizontal. The units 10 and 20 are contra-rotating.

The support 2 includes a fixed base 3 and a mobile pendulum 4, which is positioned horizontally and suspended on the base 3 by four connecting rods 5 for corner. Each connecting rod 5 is articulated both on the base 3 and on the pendulum 4, via axis pivot links parallel to the axis A1 and A2. The pendulum 4 is mobile in circular translation in relation to the base 3.

The support 2 comprises two vertical supports 6 and an upper horizontal upright 7. The connecting rods 5 are articulated on the upright 7.

Figure 2:
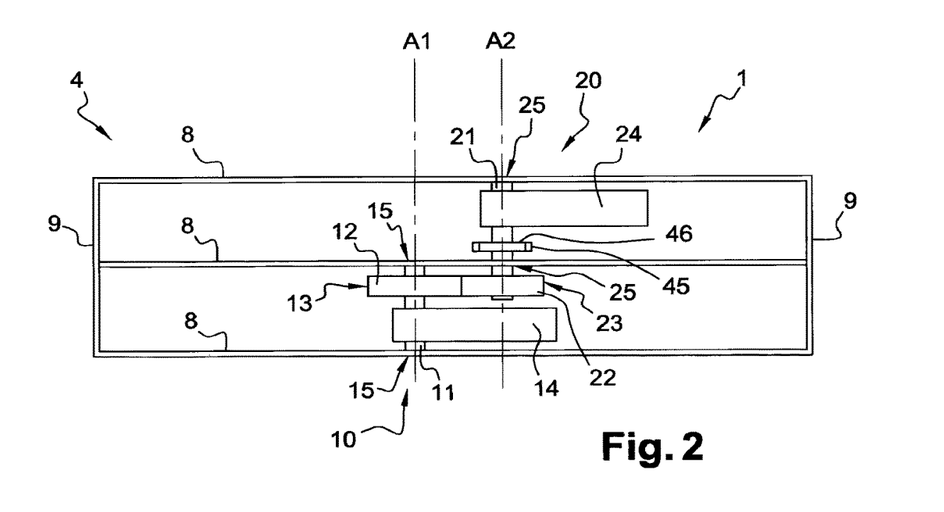
FIG. 2 is a partial top view, on a larger scale, of the pendulum equipping the mechanism in FIG. 1.

The pendulum 4 comprises three longitudinal plates 8 and transversal bars 9 fixed to the tips of the longitudinal plates 8. The connecting rods 5 are articulated on the external plates 8. The plates 8 of the pendulum 4 support the units 10 and 20. More precisely, the unit 10 is supported by the intermediary plate 8 and the front plate 8 via the bearings 15, the unit 20 is supported by the intermediary plate 8 and the rear plate 8 via the bearings 25. The axis A1 and A2 are fixed in relation to the pendulum 4.

The unit 10 comprises a shaft 11, a cog wheel 12 equipped with cogs 13, an arm 14 and bearings 15. The shaft 11, the wheel 12 and the bearings 15 are centred on the axis A1, whereas the arm 14 constitutes an eccentric element, having a centre of gravity G1 off-centred by a distance d1 in relation to the axis A1. The wheel 12 and the arm 14 are mounted on a shaft 11, which is supported by the bearings 15 mounted inside the plates 8 of the pendulum 4. The wheel 12 is mobile in rotation R1 in relation to the pendulum 4 around the axis A1.

The arm 14 is integral in rotation R1 with the wheel 12 and generates a moment M1 of gravity force P1 around the axis A1. The force P1 is relatively constant. However, the moment M1 has a value and a direction (clockwise or anticlockwise) which are variable depending on the angular position of the arm 14 around the axis A1.

The unit 20 comprises a shaft 21, a cog wheel 22 equipped with cogs 23, a arm 24 and bearings 25. The shaft 21, the wheel 22 and the bearings 25 are centred on the axis A2, whereas the arm 24 constitutes an eccentric element, having a centre of gravity G2 off-centred by a distance d2 in relation to the axis A2. The wheel 22 and the arm 24 are mounted on a shaft 21, which is supported by the bearings 25 mounted inside the plates 8 of the pendulum 4. The wheel 22 is mobile in rotation R2 in relation to the pendulum 4 around the axis A2.

The arm 24 is integral in rotation R2 with the wheel 14 and generates a moment M2 of gravity force P2 around the axis A2. The force P2 is basically constant. However, the moment M2 has a value and a direction (clockwise or anticlockwise) which are variable depending on the angular position of the arm 24 around the axis A2.

The wheels 12 and 22 engage one with the other using a unitary transmission ratio. The wheels 12 and 22 have the same dimensions and the same number of cogs 13 and 23. The wheels 12 and 22 are mobile in rotation R1 and R2 in opposing directions. In other words, the wheels 12 and 22 are contra-rotating.

In the context of the invention, the arms 14 and 24 are positioned with precision one in relation to the other and in relation to the wheels 12 and 14, in order that the moments M1 and M2 always have the same value and the same direction (clockwise or anticlockwise), regardless of the respective angular positions of the arms 14 and 24 around the axis A1 and A2.

The mass and the dimensions of the arms 14 and 24 are determined with precision, since they influence the position of the centers of gravity G1 and G2, and thus the value of the moments M1 and M2. The mass of each arm 14 and 24 is proportional to its dimensions, with constant volume mass. Preferably, the arms 14 and 24 have the same mass and the same dimensions. Alternatively, the arms 14 and 24 can have different masses and dimensions, as long as the moments M1 and M2 have the same value and the same direction (clockwise or anticlockwise) regardless of their respective angular positions.

The start-up device 40 of the mechanism 1 is designed to initiate the rotation R1 and R2 of the units 10 and 20, as from a state of equilibrium of the mechanism 1. The device 40 can present any configuration adapted to the application in question.

In the example in FIGS. 1 and 2, the device 40 comprises a motor 41, a belt 42, a transmission shaft 43, a cog wheel 44, a notched chain 45 and a cog wheel 46. The motor 41 is placed on the upright 7 of the base 3. The shaft 43 is supported at its tips by a base 3 and mobile in rotation around an axis A3, which is aligned vertically with the upper articulations of the connecting rods 5. The axis A3 is placed horizontally, parallel to the axis A1 and A2. The belt 42 links the motor 41 to the shaft 43. The wheel 44 is mounted integral in rotation with the shaft 43, whereas the wheel 46 is mounted integral in rotation with the shaft 21. Alternatively, the wheel 46 can be mounted integral in rotation with the shaft 11. The chain 45 links the wheels 44 and 46, the centre-to-centre distance of which being equal to the centre-to-centre distance of the connecting rods 5. According to another alternative, the cog wheels 44 and 46 as well as the chain 45 can be replaced by a system of universal joints, or any other movement transmission system adapted to the application in question. Hence, the start-up of the motor 41 enables to drive the units 10 and 20 in rotation R1 and R2.

In practice, the movement of the mechanism 1 enables to collect the energy in the region of the shaft 43, for example by coupling said shaft 43 with a generator. The shaft 43 thus constitutes an energy-collecting shaft.

Alternatively, for start-up the mechanism 1, the shaft 43 can be directly driven by a crank According to another variant, the mechanism 1 can be void of any motor 41 and belt 42 device constituting start-up means. In this case, the start-up of the mechanism 1 can be embodied by simply pressing on one side of the pendulum 4 or on one of the arm 14 and 24. The energy necessary for launching the mechanism 1 is quite insignificant. Preferably, the mechanism 1 comprises all the same the elements 43, 44, 45 and 46. The shaft 43 can be coupled to a generator to collect energy.

In order to enable the correct operating of the mechanism 1, the distance between the distal tip of each arm 14 and 24 and its rotation axis A1 or A2 is less than the centre-to-centre distance between the articulations of the connecting rods 5, so that the arms 14 and 24 are able to pass under the transmission shaft 43.

FIGS. 3 to 10 illustrate the operating of the mechanism 1 over a single turn. In particular, FIGS. 3 to 6 illustrate a half-turn during which the arms 14 and 24 are mobile on the right-hand side of the pendulum 4, whereas FIGS. 7 to 10 illustrate a half-turn during which the arms 14 and 24 are mobile on the left-hand side of the pendulum 4.

Figure 3:
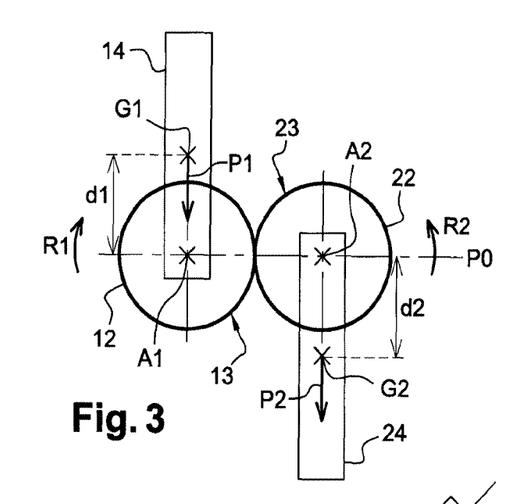
FIGS. 3 to 10 show sketches analogous of the mechanism in FIG. 1, illustrating the movements of the cog wheels and of the eccentric elements.

FIG. 3 illustrates the arm 14 positioned upwards and the arm 24 positioned downwards. The mechanism 1 is in equilibrium. The wheels 12 and 22 are stationary. The moments M1 and M2 are non-existent.

At this stage, the device 40 enables to start-up the movement of the mechanism 1, with engagement of the wheels 12 and 22, in order for the arms 14 and 24 to be both shifted to the right. The tipping of the arm 14 helps the wheel 12 to turn in the direction of rotation R1, which enables to drive the wheel 22 in the direction of rotation R2, and thus to lift up arm 24.

Figure 4:
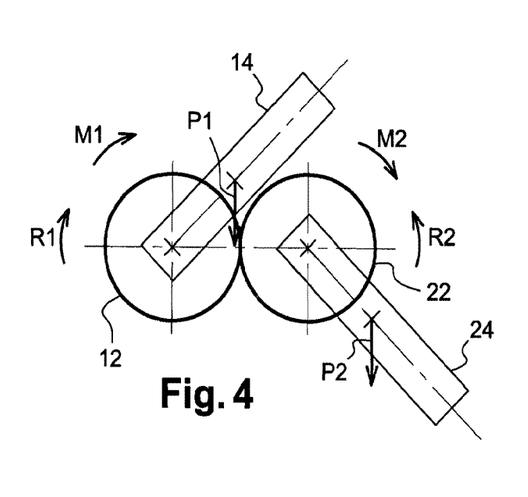
Figure 5:
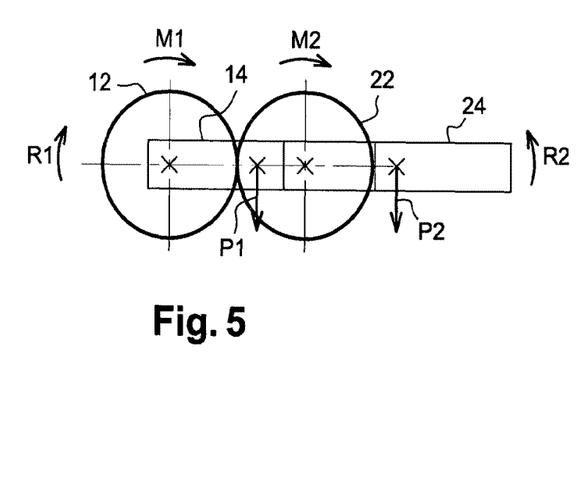
Figure 6:
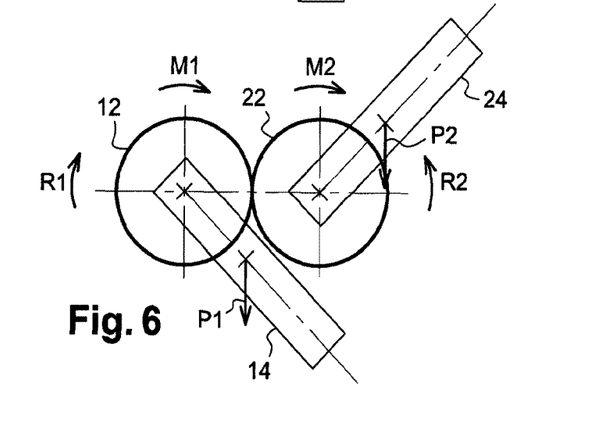

FIG. 4 illustrates the arms 14 and 24, each one having made one-eighth of a turn on the right-hand side. FIG. 5 illustrates the arms 14 and 24, each one having made a quarter turn on the right-hand side. FIG. 6 illustrates the arms 14 and 24, each one having made a three-quarter turn on the right-hand side. At each moment, the moments M1 and M2 have the same value and the same direction (clockwise). Through the action of the arms 14 and 24, the pendulum 4 is driven upwards from the right.

Figure 7:
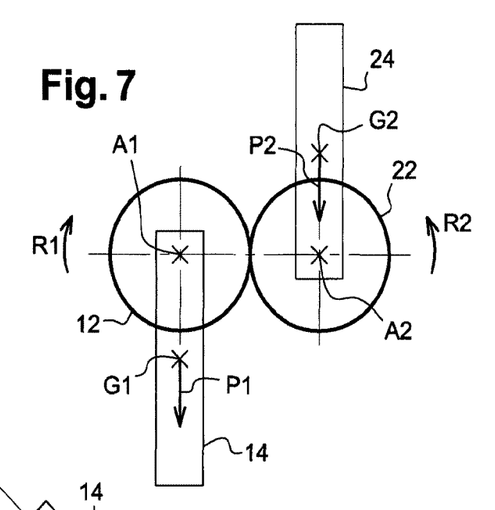

FIG. 7 illustrates the arms 14 and 24, each one having made a half turn in relation to their initial position in FIG. 3. The arm 14 is positioned downwards, whereas the arm 24 is positioned upwards. The moments M1 and M2 are non-existent. The wheels 12 and 22 are in motion, in order for the arms 14 and 24 to be both shifted to the right. The tipping of the arm 24 helps the wheel 22 to turn in the direction of rotation R2, which enables to help the wheel 22 to turn in the direction of rotation R1, and thus to lift up the arm 14.

Figure 8:
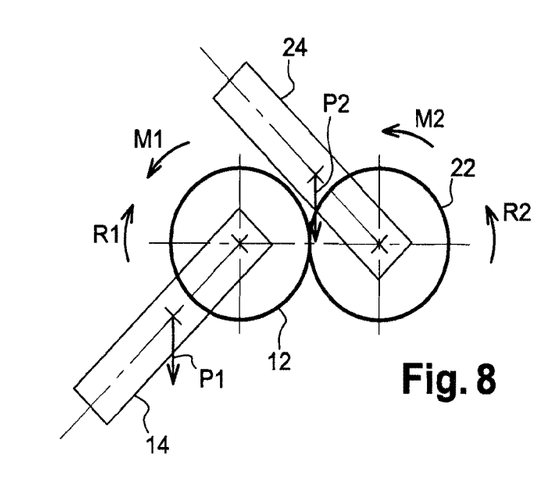
Figure 9:
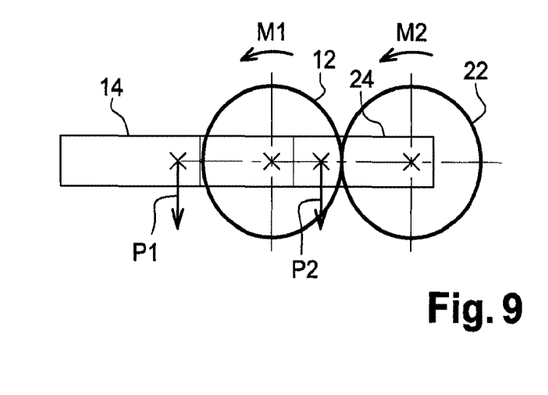
Figure 10:
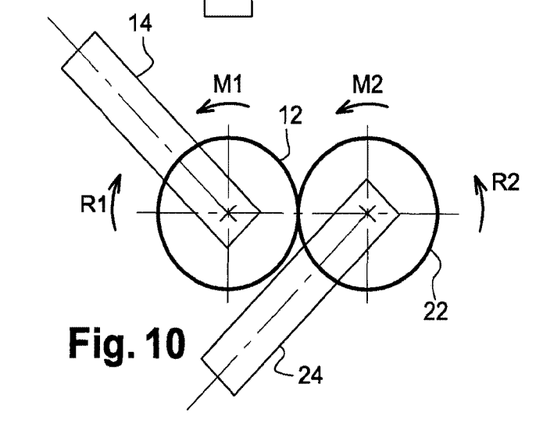
Figure 11:
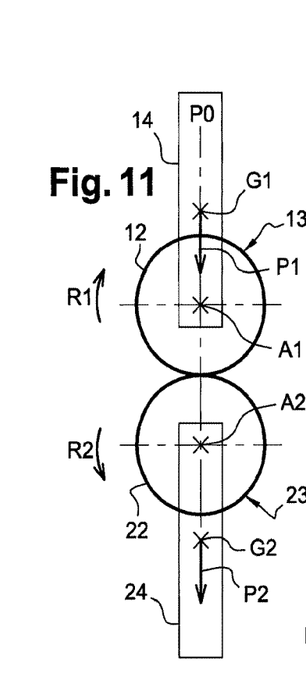
FIGS. 11 to 14 show sketches analogous to FIGS. 3 to 6 for a mechanism according to a second embodiment of the invention.
Figure 12:
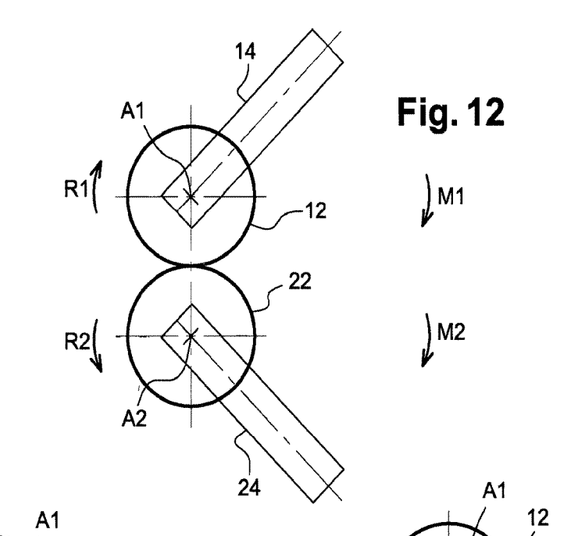
Figure 13:
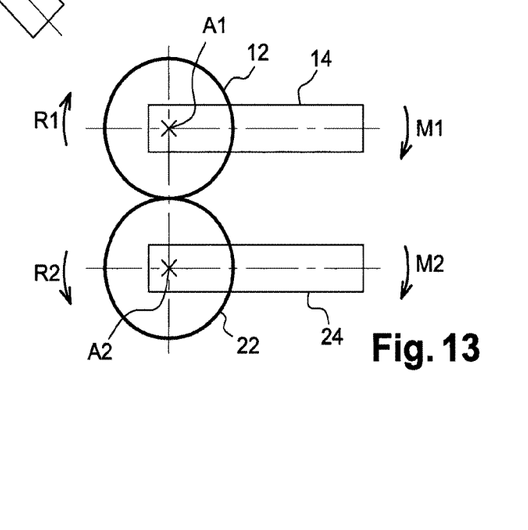
Figure 14:
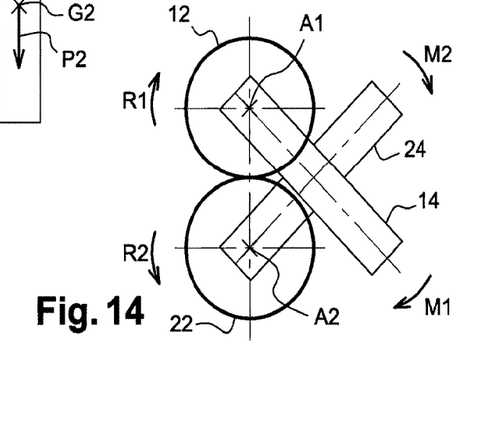

FIG. 8 illustrates the arms 14 and 24, each one having made one-eighth of a turn on the left-hand side. FIG. 9 illustrates the arms 14 and 24, each one having made a quarter turn on the left-hand side. FIG. 10 illustrates the arms 14 and 24, each one having made a three-quarter turn on the left-hand side. At each time, the moments M1 and M2 have the same value and the same direction (anti-clockwise). Under the action of the arms 14 and 24, the pendulum 4 is driven to the left.

As the units 10 and 20 pivot around the axis A1 and A2, the arms 14 and 24 are thus situated sometimes on the right, sometimes on the left. In practice, the rotation R1 and R2 of the arms 14 and 24 generate centrifugal forces within the mechanism 1. The pendulum 4 shifts sometimes to the right, sometimes to the left. By consequence, the arms 14 and 24 follow an elliptical movement instead of a circular movement.

The mechanism 1 follows a two-phase oscillatory movement. The centrifugal forces are maximal when the arms 14 and 24 pass each other, in FIGS. 5 and 9. Each phase corresponds to a half turn (180°) by the arms 14 and 24, in between their maximal centrifugation positions.

Considering the explanations above, it is remarkable that for each angular position of the cog wheels 12 and 22 and of the arms 14 and 24 around the axis A1 and A2, the mechanism 1 presents an equilibrium configuration at rest. In other words, when considering the mechanism 1 at a standstill, regardless of the angular position of the units 10 and 20, the mechanism 1 then finds itself in a rest configuration. The mechanism 1 is balanced, which considerably reduces the energy necessary to make the units 10 and 20 turn.

FIGS. 11 to 14 illustrate the operating of a mechanism 1 according to a second embodiment. The axis A1 and A2 are parallel to each other and horizontal. However, the axis A1 and A2 are placed within a reference plane P0 which is vertical.

Also in this embodiment, the arms 14 and 24 are positioned with precision one in relation to the other and in relation to the wheels 12 and 14, in order that the moments M1 and M2 always have the same value and the same direction (clockwise or anticlockwise), regardless of the respective angular positions of the arms 14 and 24 around the axis A1 and A2.

Only the position of the arms 14 and 24 on the right-hand side is illustrated in FIGS. 11 to 14, whereas the position of the arms 14 and 24 of the left-hand side is not illustrated, for simplification reasons.

In practice, a single mechanism 1 does not enable to constitute a motor regarding the lost energy. Nevertheless, it is possible to manufacture a motor by associating several mechanisms 1 synchronised, as explained in detail hereafter.

Figure 15:
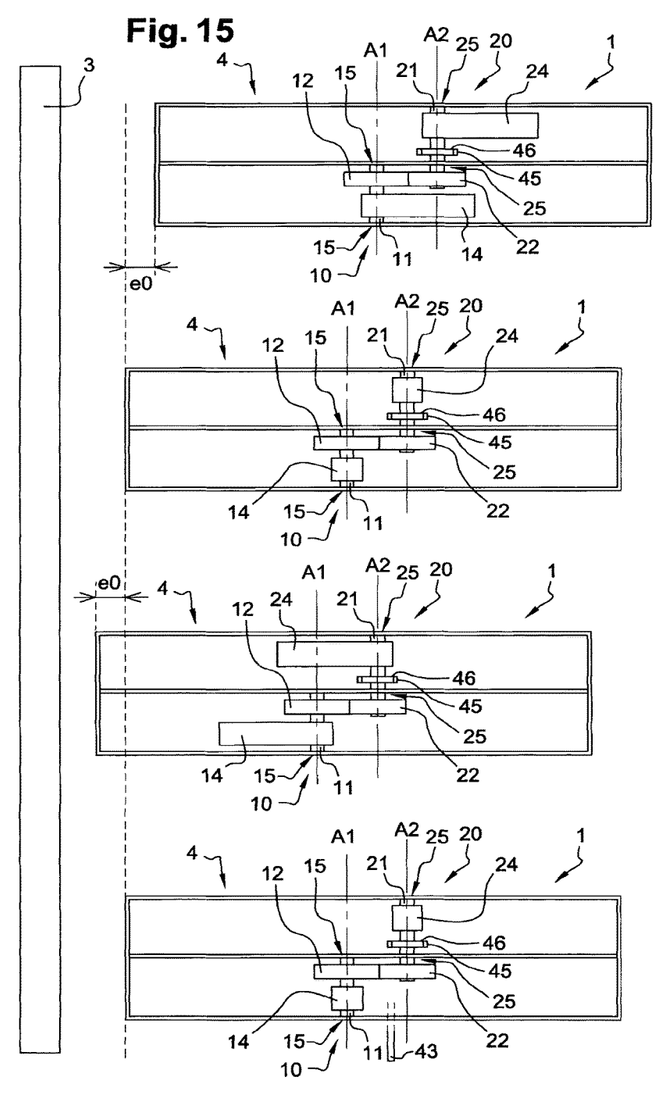
FIG. 15 is a view similar to FIG. 2, showing an example of a machine according to the invention, equipped with four pendulum mechanisms in parallel.
Figure 16:
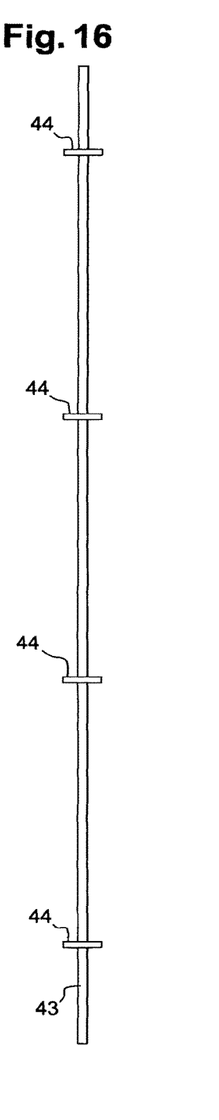
FIG. 16 is a complementary view of FIG. 15, showing the shaft common to the various mechanisms.

FIGS. 15 and 16 illustrate a rotating machine example according to the invention, of the four-stroke motor type. The motor comprises four mechanisms 1, each one equipped with its own pendulum 4. The mechanisms 1 and their pendulums 4 are placed in parallel to each other, i.e. side by side.

The base 3 is common to all mechanisms 1. In other words, the base 3 supports each of the pendulums 4 suspended in parallel to each other. The base 3 is only partially illustrated, for simplification reasons.

The transmission shaft 43 is also common to all the mechanisms 1. The movement of the mechanisms 1 thus enables to collect the energy in the region of the shaft 43, for example by coupling said shaft 43 with a generator 58. The shaft 43 then constitutes an energy-collection shaft. The shaft 43 is only partially illustrated at the bottom of FIG. 15 for the sake of simplicity, and illustrated entirely with its four cog wheels 45 in FIG. 16.

In practice, the four arms 14 are offset by a quarter turn one in relation to another. Likewise, the four arms 24 are offset by a quarter turn one in relation to another. Hence, the motor always has the same number of arms 14 or 24 on the left-hand side or the right-hand side, thereby improving its yield. Each phase corresponds to a quarter turn (90°) of the mechanisms 1.

When two mechanisms 1 are both at dead center (moments M1 and M2 non-existent) the other two mechanisms 1 are in maximal centrifugation positions, respectively on the left-hand side and on the right-hand side, with a deviation e0 on each side. The energy generated is maximal in said maximal centrifugation positions, or thrust positions. As the four mechanisms 1 are never at the dead center at the same time, the motor has no dead center. Advantageously, each maximal centrifugation position corresponds to a gas combustion inside the motor.

Figure 17:
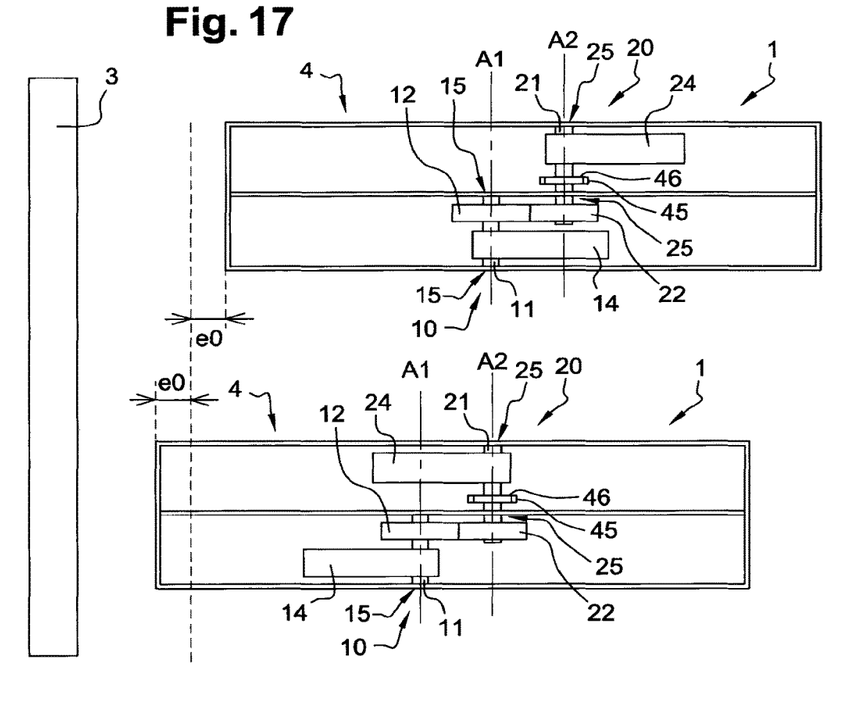
FIG. 17 is a view similar to FIG. 15, showing another example of a machine according to the invention, equipped with two pendulum mechanisms in parallel.

FIG. 17 illustrates another rotating machine example according to the invention of the two-stroke motor type, according to a variant of FIG. 15. In this case, the motor comprises two mechanisms 1, each one equipped with its own pendulum 4.

As illustrated on FIG. 15, the base 3 is common to both mechanisms 1, and supports each of the pendulums 4 placed in parallel to each other. The transmission shaft 43 is also common to both mechanisms 1, so that the movement of both mechanisms enables to recover energy at the shaft. For simplification reasons, the base 3 and the shaft 43 are only partially illustrated on FIG. 17.

In this embodiment, the two arms 14 are offset by an half turn one in relation to another. Likewise, the two arms 24 are offset by a half turn one in relation to another. As above mentioned, the motor always has the same number of arms 14 or 24 on the left-hand side or the right-hand side, thereby improving its yield. Each phase corresponds to a half turn (180°) of the mechanisms 1.

During a 360° rotation, the two mechanisms 1 are simultaneously at the dead centers (moments M1 and M2 non-existent), and simultaneously in thrust positions, each corresponding to a combustion of gas in the engine.

According to another non-represented variant, the rotating machine comprises eight mechanisms 1 with pendulums 4 placed in parallel. During a turn, the machine produces a thrust every eighth of a turn (45°) of the mechanisms 1.

Other variants can be implemented without departing from the scope of the invention. The dimensions of the constitutive elements of the machine, for example the base 3 and the transmission shaft 43, vary according to the number of mechanisms 1.

In order to obtain the best results and yields, it is important that each pendulum 4 is positioned within a rigorously horizontal plane. The same applies for the axis A1 and A2 of the cog wheels 12 and 22, which must be situated in a rigorously horizontal or vertical plane P0, depending on the configuration of the mechanism 1.

Figure 18:
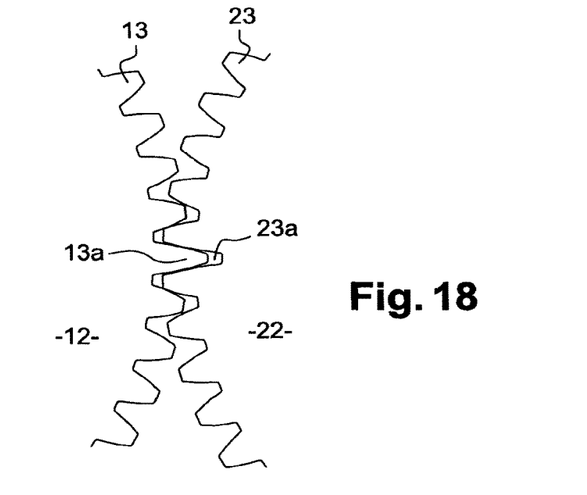
FIG. 18 is a partial detail view of the engagement between the two cog wheels of the mechanism, in a particular embodiment of the invention.

FIG. 18 represents a particular and preferred embodiment of the invention, wherein the wheel 12 has a cog 13a longer than the other cogs 13, whereas the wheel 22 has a groove 23a formed between two cogs 23. The cog 13a and the groove 23a can present different shapes without departing from the scope of the invention.

In practice, the cog 13a and the groove 23a coincide at the time of engagement of the cog wheels 12 and 22, which enables the alignment of the eccentric elements 14 and 24, and thus the precise balancing of the mechanism 1.

For example, the cog wheels 12 and 22 and the eccentric elements 14 and 24 can be equipped with fixing holes placed opposite each other, not represented in the different figures for simplification reasons. Hence, the cog 13a and the groove 23a facilitate the alignment of said fixing holes.

FIGS. 19 to 24 illustrate another rotating machine example according to the invention, of the two-stroke motor type, according to a variant of FIG. 17. The motor comprises two mechanisms 1 according to the invention, each one equipped with its own pendulum 4. The mechanisms 1 and their pendulums 4 are placed in series, i.e. aligned in the prolongation of each other.

Figure 19:
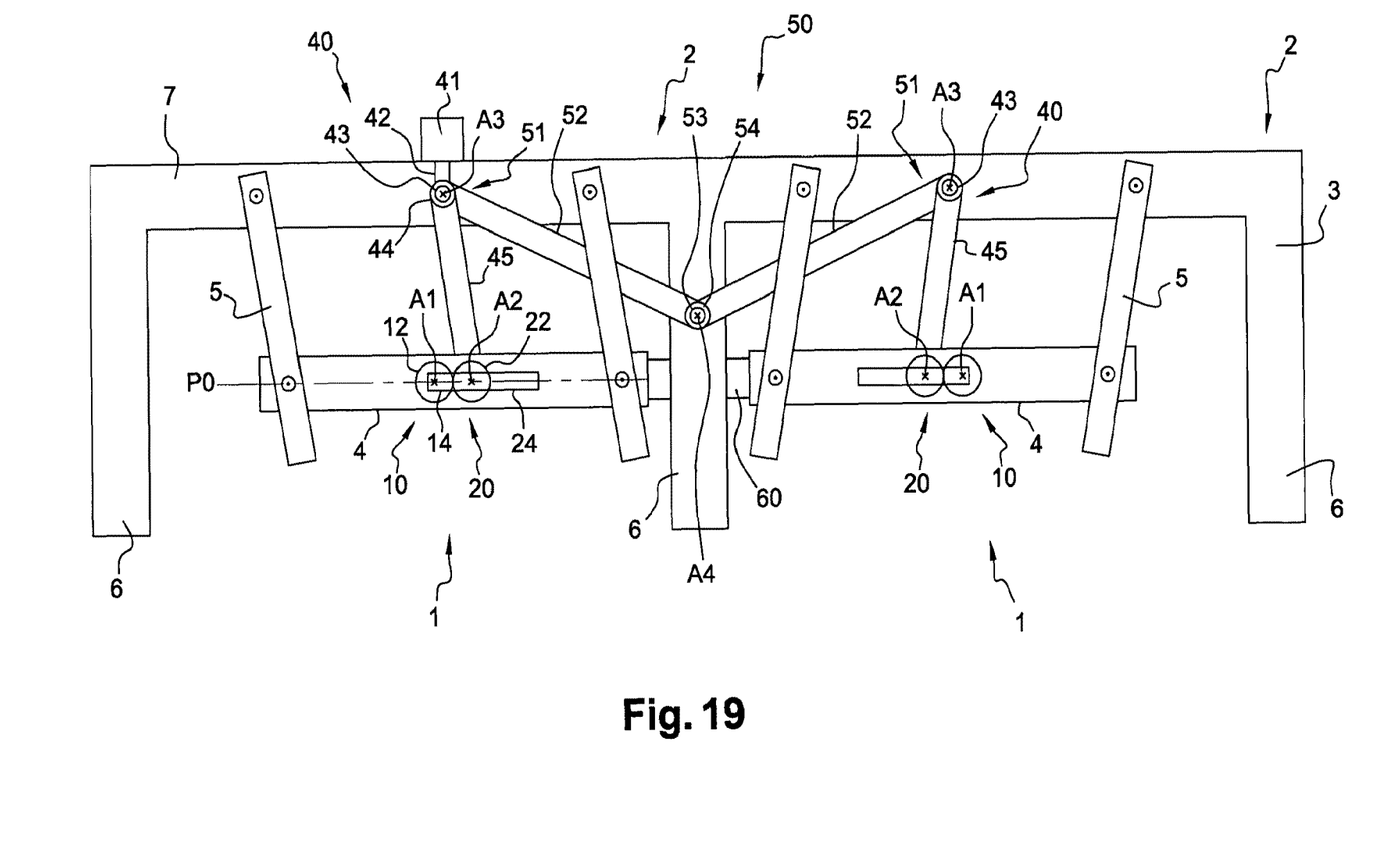
FIG. 19 is a view similar to FIG. 1, showing another example of a machine according to the invention, equipped with two pendulum mechanisms in series.

The base 3 is common to both mechanisms 1. In other words, the base 3 supports each of the pendulums 4 suspended in series.

Each mechanism 1 comprises its own transmission shaft 43, having an axis A3 aligned with the upper articulations of the connecting rods 5. However, only one motor 41 is necessary for the start-up of the mechanisms 1. Alternatively, the motor 41 can be replaced by a crank, or the machine can be void of means for starting up the mechanisms 1.

The machine comprises an intermediary device 50 in between the devices 40 of the two mechanisms 1. Said device 50 can be used for the transmission of movement between the two devices 40, as well as for the collection of energy. In the example of FIG. 19, the device 50 comprises two cog wheels 51, two notched chains 52, one shaft 53 and two cog wheels 54. The shaft 53 is mobile in rotation around an axis A4, which is placed horizontally, parallel to the axis A1, A2 and A3. The shaft 53 is supported at its tips by the base 3, for example, by two supports 6 of the base 3. Alternatively, the shaft 53 can be supported by the upright 7 so that its axis A4 is aligned with the axis A3 of the mechanisms 1. The wheels 51 are mounted integral in rotation with the shafts 43 of the two mechanisms 1 while the wheel 54 is mounted integral in rotation with the shaft 53. The chains 52 connect the wheels 51 and the wheel 54. Thus, the movement of the various mechanisms 1 makes it possible to recover energy at the shaft 53, for example by coupling this shaft 53 to a generator. The shaft 53 then constitutes a shaft for recovering energy.

Figure 21:
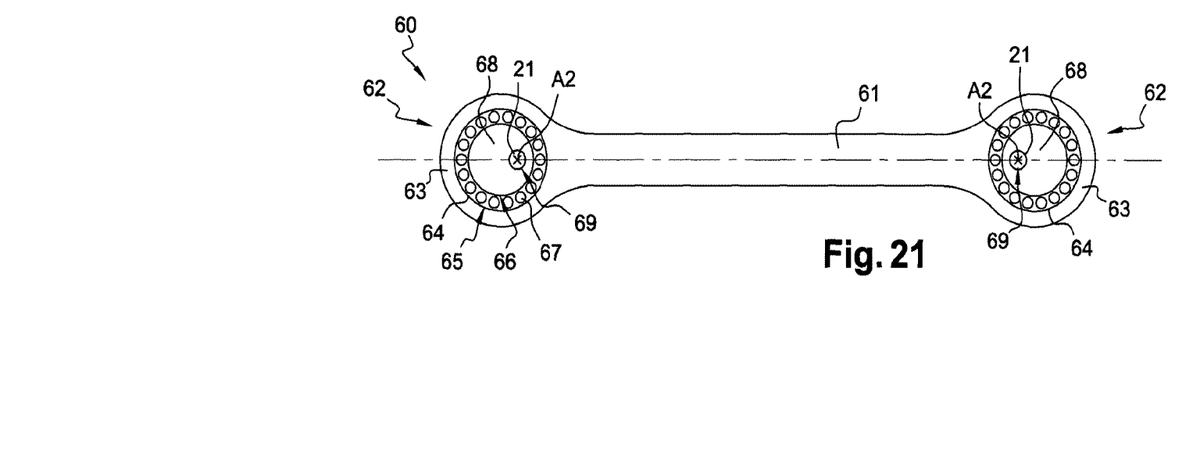
FIG. 21 is a side view of the connecting link rod equipping the machine of FIGS. 19 and 20.

The machine also comprises a connecting link rod 60 coupled with the two mechanisms 1, thus ensuring their synchronization and a considerable reduction in vibrations. The connecting link rod 60 comprises a central body 61 connecting two heads 62 located at its longitudinal ends. Each head 61 comprises an annular part 63 in which a ball bearing 64 is housed. Alternatively, this annular part 63 may comprise any type of bearing suitable for the intended application. Each ball bearing 64 comprises an outer ring 65, an inner ring 66 and a row of balls 67. In the inner ring 66 is housed a sleeve 68 comprising an eccentric opening 69 for receiving the shaft 21 of the mechanism 1. The sleeve 68 Is integral with the shaft 21 and movable in rotation in the ball bearing 64. Thus, the shaft 21 of each mechanism 1 is mobile in rotation in one of the heads 61 of the connecting link rod 60.

Figure 20:
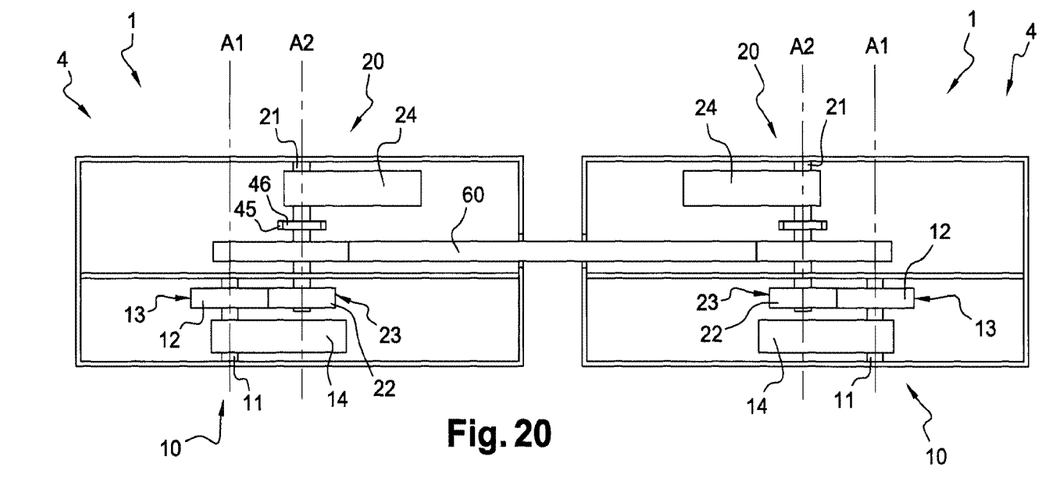
FIG. 20 is a view similar to FIG. 2, showing the machine of FIG. 19.

In FIGS. 20 and 21, the mechanisms 1 are brought closer together. The elements 14 and 24 are oriented towards the center of the machine. The shafts 21 coupled to the connecting link rod 60 are brought closer together.

Figure 22:
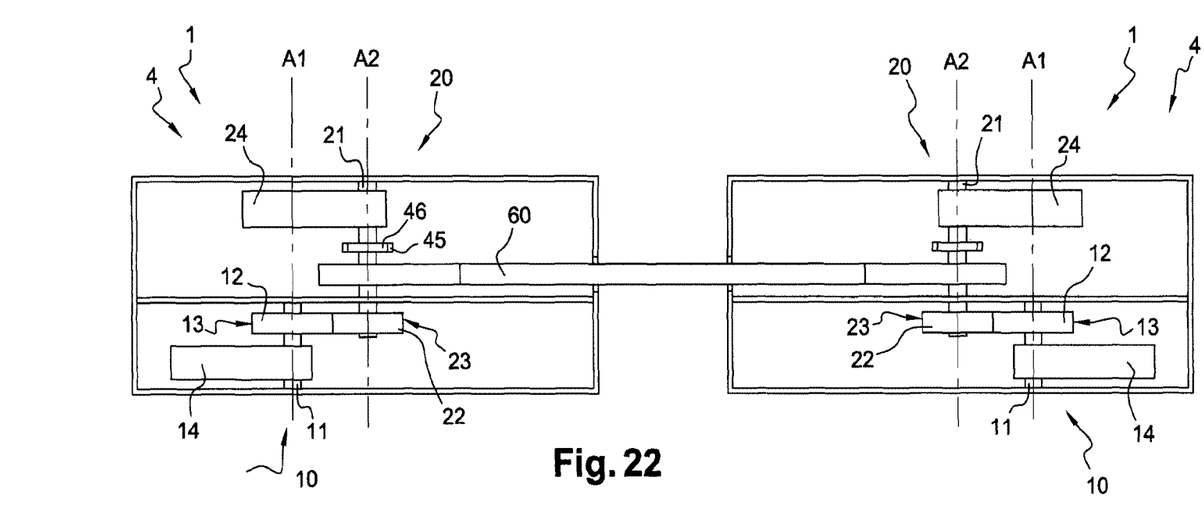
FIGS. 22 and 23 are views similar respectively to FIGS. 20 and 21, in another configuration of the machine.
Figure 23:
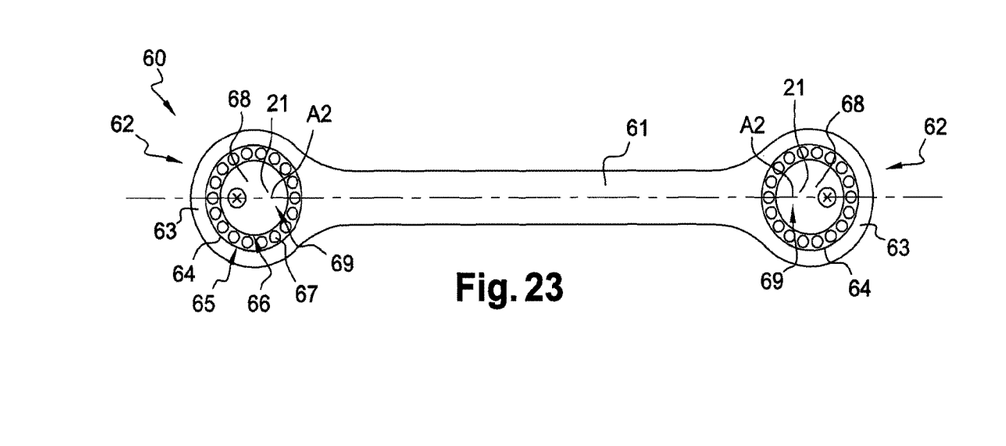

In FIGS. 22 and 23, the mechanisms 1 are remote. The elements 14 and 24 are oriented towards the sides of the machine. The shafts 21 coupled to the connecting link rod 60 are remote.

During the movement of the mechanisms 1 and more particularly of their units 10 and 20, the connecting rod 60 is fixed horizontally and vertically movable. Although the connecting link rod 60 is theoretically free to move in space, it is not animated by a horizontal movement because of its positioning at equilibrium between the two mechanisms 1. The connecting link rod 60 is made of material(s) having a good compromise between resistance and flexibility, due to the large stresses to which the connecting link rod 60 is subjected.

Figure 24:
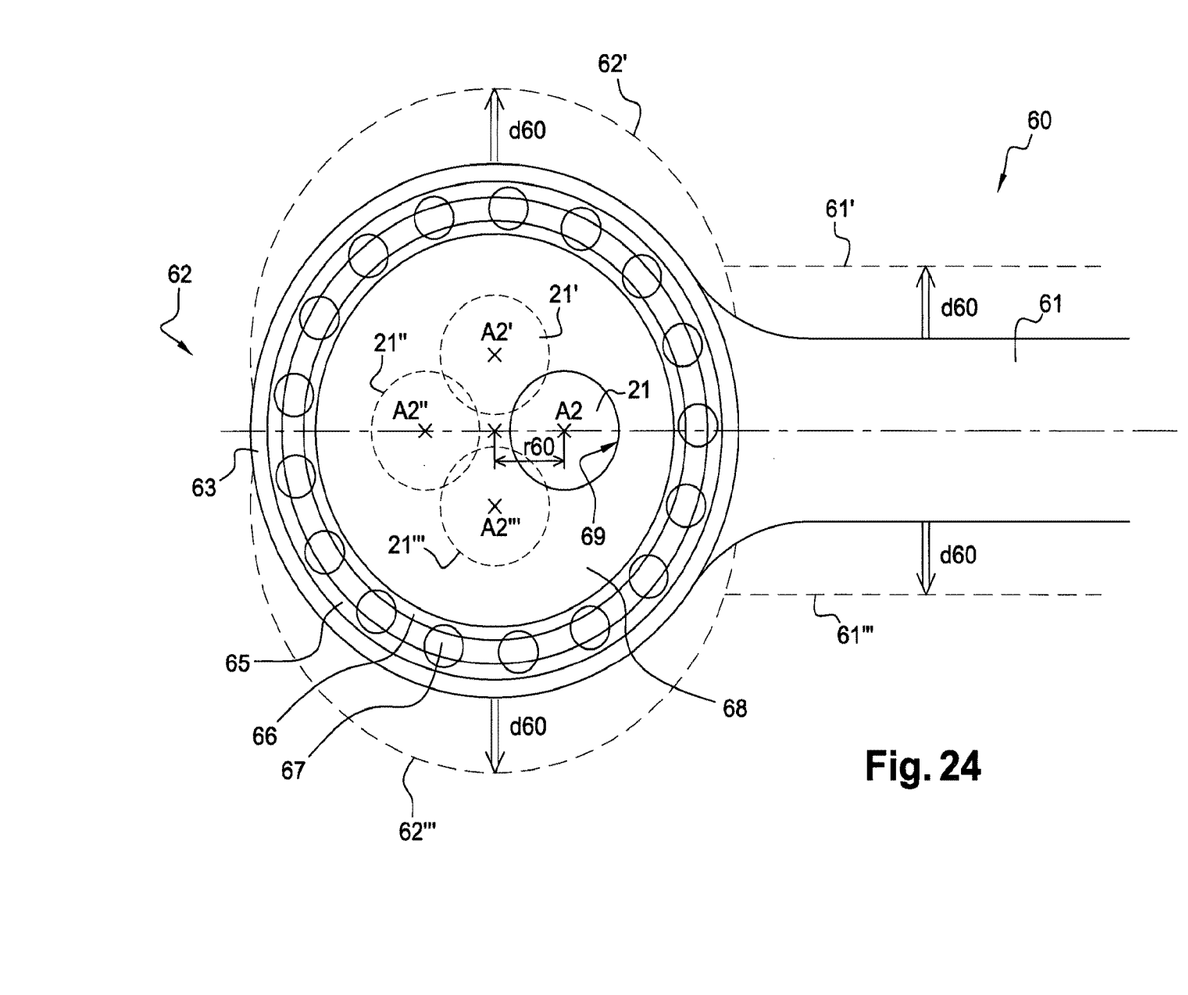
FIG. 24 is a view on a larger scale of one end of the connecting link rod of FIGS. 21 and 23, showing different positions during the operation of the machine.

In FIG. 24, the connecting link rod 60 is partially shown in different positions during operation of the machine. More particularly, FIG. 24 shows the left head 62 of the connecting link rod 60, coupled to the left-hand mechanism 1 in FIGS. 19 to 23. The elements 21, A2, 61 and 62 shown in the right position are referenced 21', A2', 61' and 62' in the higher position, 21", A2", 61 and 62 in the left position, and 21''', A2''', 61''' and 62''' in the lower position. A central axis A0 of the head 62, the ball bearing 64 and the sleeve 68 is defined. This axis A0 constitutes the axis of rotation of the axis A2 during the movement of the mechanism 1. A constant radius r60 is also defined between the axis A0 and A2. Finally, there is defined a vertical deviation d60 of the connecting link rod 60 upwards and downwards. The deviation d60 is equal to the radius r60. As non-limiting examples, the diameter of the shaft 21 is equal to 30 millimeters, the outside diameter of the outer ring 65 is equal to 140 millimeters, the inside diameter of the inner ring 66 is equal to 110 millimeters, and the radius r60 is equal to 20 millimeters. Thus, the vertical deviation d60 of the connecting link rod 60 is equal to 20 millimeters upwards and 20 millimeters downwards.

The two arms 14 are disposed offset by half-turn with respect to one another. Similarly, the two arms 24 are disposed offset by half-turn with respect to one another. The motor always has the same number of arms 14 or 24 on the left or right side. Each phase corresponds to a rotation of a half turn (180°) of the mechanisms 1.

During a 360° rotation, the two mechanisms 1 are simultaneously at the dead centers (moments M1 and M2 non-existent), and simultaneously in thrust positions, each corresponding to a combustion of gas in the engine.

Figure 25:
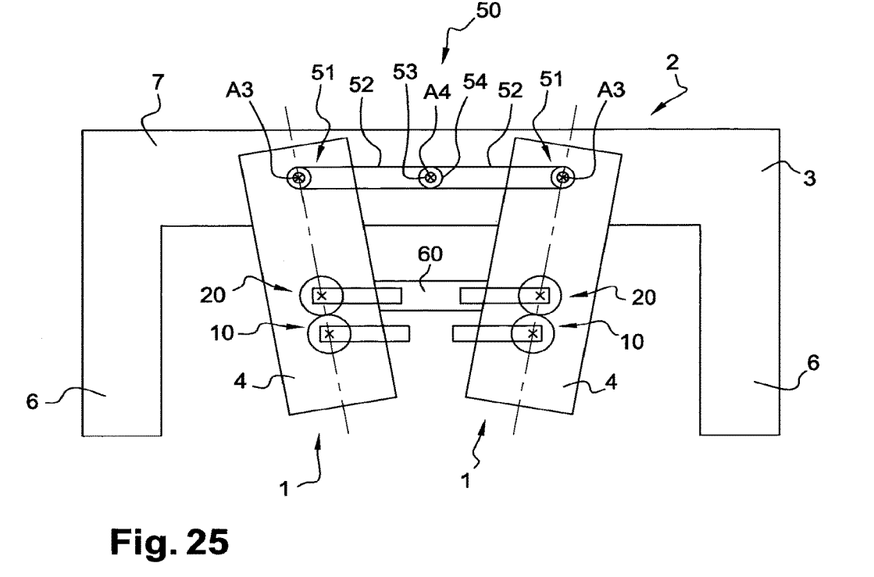
FIG. 25 is a view similar to FIG. 19, showing another example of a machine according to the invention, equipped with two pendulum mechanisms in series.

FIG. 25 illustrates another example of a rotary machine according to the invention, of the two-stroke engine type, according to a variant of FIG. 19. The engine comprises two mechanisms 1 according to the invention, each equipped with its own pendulum 4. The pendulums 4 are suspended directly on the base 3 and arranged in series. During the movement of the mechanisms 1 and more particularly of their units 10 and 20, the connecting link rod 60 is fixed horizontally and vertically movable.

Figure 26:
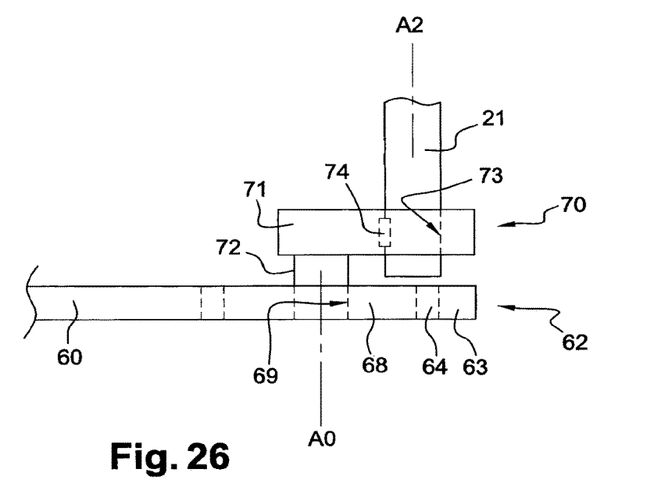
FIG. 26 is a top view showing a variant of coupling between the connecting link rod and the mechanism.

FIG. 26 illustrates another way of connecting the connecting link rod 60 to the mechanism 1. The opening 69 is formed in the center of the sleeve 68 and centered on the axis A0. An eccentric part 70 is interposed between the shaft 21 and the connecting link rod 60. The part 70 comprises an elongated body 71 and a cylindrical crankpin 72 integral with the body 71. An opening 73 is formed in the body 71. The shaft 21 is disposed in the orifice 73 and secured to the body 71, for example by means of a key 74 or by any other means. The shaft 21 and the opening 73 are centered on the axis A2. The crankpin 72 is disposed in the opening 69 of the sleeve 68, centered on the axis A0. This axis A0 constitutes the axis of rotation of the axis A2 during the movement of the mechanism 1.

According to another variant not shown, the rotating machine comprises four pendulum mechanisms 1, arranged both in parallel and in series. Two pairs of mechanisms 1 are arranged in parallel and synchronized with one another. Within each pair, two mechanisms are arranged in series and synchronized with one another. During one turn, the machine produces a thrust every quarter turn (90°) of the mechanisms 1.

According to another non-represented variant, the rotating machine comprises eight mechanisms 1 with pendulums 4 placed in parallel and in series. During a turn, the machine produces a thrust every eighth of a turn (45°) of the mechanisms 1.

In FIGS. 1 to 26, certain movements and distances are exaggerated for simplification reasons, as for example the lateral deviation of the pendulums 4.

In practice, the mechanism 1 and the machine can be conformed differently from FIGS. 1 to 26 without departing from the scope of the invention.

For example, the transmission system by chains and cog wheels can be replaced by a system of universal joints, or any other movement transmission system adapted to the application in question.

In addition, the technical characteristics of the different embodiments and variants mentioned above can, in totality or for certain among them, be combined together. Hence, the mechanism 1 and the machine can be adapted in terms of cost, of functionalities and of performance.

The invention claimed is:

1. A mechanism (1), comprising:
   a support (2);
   a first cog wheel (12) mobile in rotation (R1) in relation to the support (2) around a first axis (A1);
   a second cog wheel (22) mobile in rotation (R2) in relation to the support (2) around a second axis (A2);
   a first eccentric element (14) integral with the first cog wheel (12) in rotation (R1) and generating a first moment (M1) of gravity force (P1) around the first axis (A1); and
   a second eccentric element (24) integral with the second cog wheel (22) in rotation (R2) and generating a second moment (M2) of gravity force (P2) around the second axis (A2);
   wherein the first and second axes (A1; A2) are parallel within a horizontal or vertical reference plane (P0);
   wherein the first and second cog wheels (12; 22) engage one with the other using a unitary transmission ratio and are mobile in rotation (R1; R2) in opposing directions;
   wherein the first and second moments (M1; M2) of gravity force (P1; P2) of the first and second eccentric elements (14; 24) have a same value and a same direction, both being variable depending on an angular position of each of the first and second eccentric elements (14; 24) around the first and second axes (A1; A2);
   and wherein for each angular position of the first and second cog wheels (12; 22) and of the first and second eccentric elements (14; 24) around the first and second axes (A1; A2), the mechanism (1) presents an equilibrium configuration at rest.

2. The mechanism (1) according to claim 1, wherein the first and second eccentric elements (14; 24) have a same mass and same dimensions.

3. The mechanism (1) according to one of the previous claim 1 or 2, wherein the first and second cog wheels (12; 22) comprise a first wheel (12) having a cog (13a) longer than the other cogs (13) and a second wheel (22) having a groove (23a) formed between two cogs (23), and wherein the longer cog (13a) and the groove (23a) coincide when the first and second cog wheels (12; 22) engage, thereby enabling alignment of the first and second eccentric elements (14, 24).

4. The mechanism (1) according to claim 1, wherein the first and second axes (A1; A2) of the first and second cog wheels (12; 22) are horizontal, and the reference plane (P0) is horizontal.

5. The mechanism (1) according to claim 1, wherein the first and second axes (A1; A2) of the first and second cog wheels (12; 22) are horizontal, and the reference plane (P0) is vertical.

6. The mechanism according to claim 1, wherein the support (2) comprises a base (3) and a pendulum (4) which is suspended on the base and which supports the first and second axes (A1; A2) of the first and second cog wheels (12; 22), wherein the first and second axes (A1, A2) are movable with the pendulum (4), and wherein the first and second eccentric elements (14; 24) describe an elliptical motion.

7. A rotary machine, wherein the machine comprises at least one mechanism (1) according to claim 1.

8. The rotary machine according to claim 7, wherein the machine is an internal combustion engine, and wherein the first and second eccentric elements (14; 24) equipping the mechanism (1) join up in two maximal centrifugation positions, each one corresponding to a combustion of gas inside the engine.

9. The rotary machine according to claim 7, wherein the machine comprises the at least one mechanism (1) in which the support (2) comprises a base (3) and a pendulum (4) which is suspended on the base and which supports the first and second axes (A1; A2) of the first and second cog wheels (12; 22), wherein the first and second axes (A1, A2) are movable with the pendulum (4), and wherein the first and second eccentric elements describe (14; 24) describe an elliptical movement.

10. The rotary machine according to claim 9, wherein the machine comprises at least one pair of said mechanisms (1), wherein the pendulum (4) of each support of each of said mechanisms is placed in series and synchronised.

11. The rotary machine as claimed in claim 10, wherein the machine comprises a connecting link rod (60) coupled to the at least one pair of mechanisms (1) arranged in series, the connecting link rod (60) being stationary in a horizontal direction, and movable in a vertical direction during the movement of the mechanisms (1).

12. The rotary machine according to claim 10, wherein the machine is a two-stroke motor comprising two mechanisms (1) with pendulums, wherein the first two eccentric elements (14) are placed at half-turn intervals, and wherein the second two eccentric elements (24) are placed at half-turn intervals.

13. The rotary machine according to claim 10, wherein the machine is a four-stroke motor comprising four mechanisms (1), wherein the first four eccentric elements (14) are placed at quarter-turn intervals, and wherein the second four eccentric elements (24) are placed at quarter-turn intervals.

14. The rotary machine according to claim 9, wherein the machine comprises at least two of said mechanisms (1) wherein the pendulum (4) of each support of each of said two mechanisms is placed in parallel and synchronised.

15. The rotary machine according to claim 9, wherein the machine comprises several pairs of mechanisms (1), wherein the pendulum (4) of each of the respective supports of the several pairs of mechanisms being placed in series and synchronised within each pair, the several pairs being placed in parallel and synchronized among themselves.

16. The rotary machine according to claim 9, wherein the machine is void of dedicated start-up means for the at least one mechanism (1), and that the start-up of the at least one mechanism (1) is doable by a simple push on at least one of the pendulums (4) or on one of the first and second eccentric elements (14; 24).

17. The rotating machine according to claim 9, wherein the base (3) is common to all the pendulums (4).

18. The rotary machine according to claim 7, further comprising a start-up means (40) for the mechanism or mechanisms (1), designed to drive one of the first and second cog wheels (12; 22) into rotation (R1; R2).

19. The rotary machine according to claim 18, wherein the start-up means (40) comprise a motor (41).

20. The rotary machine according to claim 18, wherein the start-up means (40) comprise a crank.

21. The rotary machine according to claim 7, further comprising an energy-collection means while the mechanism is in motion.

22. An implementation method of the mechanism (1) according to claim 1, wherein the method comprises the following successive steps:

- a positioning step of the first and second eccentric elements (14; 24) one in relation to the other and in relation to the first and second cog wheels (12; 22), in order that the first and second moments (M1; M2) of gravity force (P1; P2) of the first and second eccentric elements (14; 24) have a same value and a same direction, both being variable according to an angular position of the first and second cog wheels around the first and second axes (A1; A2), and that for each angular position of the first and second cog wheels (12; 22) and of the first and second eccentric elements (14; 24) around the first and second axes (A1; A2), the mechanism (1) presents an equilibrium configuration at rest;
- a rotation (R1; R2) start-up step of the first and second cog wheels (12; 22) and of the first and second eccentric elements (14; 24) around the first and second axes (A1; A2), wherein the mechanism (1) quits the equilibrium configuration and sets in motion; and
- an operating step, wherein the rotation (R1; R2) of the first and second eccentric elements (14; 24) around the first and second axes (A1; A2) generates centrifugal force within the mechanism (1).

* * * * *